(12) United States Patent
Gallegos-Lopez et al.

(10) Patent No.: US 8,519,648 B2
(45) Date of Patent: Aug. 27, 2013

(54) TEMPERATURE COMPENSATION FOR IMPROVED FIELD WEAKENING ACCURACY

(75) Inventors: Gabriel Gallegos-Lopez, Lomita, CA (US); Min Dai, Torrance, CA (US); Brian A. Welchko, Torrance, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 249 days.

(21) Appl. No.: 13/189,440

(22) Filed: Jul. 22, 2011

(65) Prior Publication Data

US 2013/0020971 A1    Jan. 24, 2013

(51) Int. Cl.
*H02P 21/14*    (2006.01)

(52) U.S. Cl.
USPC ............ 318/400.02; 318/400.01; 318/400.07; 318/432; 318/609; 318/722

(58) Field of Classification Search
USPC ............ 318/400.01, 400.02, 400.07, 400.17, 318/432, 722, 609, 610
See application file for complete search history.

(56) References Cited

U.S. PATENT DOCUMENTS

| | | | | |
|---|---|---|---|---|
| 5,365,158 | A * | 11/1994 | Tanaka et al. ................. | 318/806 |
| 6,674,262 | B2 * | 1/2004 | Kitajima et al. .............. | 318/722 |
| 6,700,400 | B2 * | 3/2004 | Atarashi ................. | 318/400.01 |
| 7,759,886 | B2 * | 7/2010 | Gallegos-Lopez et al. ........................... | 318/400.2 |
| 7,830,106 | B2 * | 11/2010 | Fukuchi et al. .............. | 318/432 |
| 7,859,207 | B2 * | 12/2010 | Yamada et al. .......... | 318/400.02 |
| 7,893,637 | B2 * | 2/2011 | Suhama et al. ............... | 318/376 |
| 7,923,953 | B2 | 4/2011 | Gallegos-Lopez et al. | |
| 8,228,016 | B2 * | 7/2012 | Gallegos-Lopez et al. ... | 318/609 |
| 8,344,680 | B2 * | 1/2013 | Kitanaka ........................ | 318/632 |
| 2002/0097015 | A1 * | 7/2002 | Kitajima et al. .............. | 318/432 |
| 2002/0113615 | A1 * | 8/2002 | Atarashi ........................ | 324/772 |
| 2008/0030163 | A1 * | 2/2008 | Fukuchi et al. ............... | 318/801 |
| 2009/0027000 | A1 * | 1/2009 | Gallegos-Lopez et al. ... | 318/722 |
| 2009/0284195 | A1 * | 11/2009 | Gallegos-Lopez et al. ........................... | 318/400.02 |
| 2009/0295316 | A1 * | 12/2009 | Patel et al. ............... | 318/400.02 |
| 2010/0231149 | A1 * | 9/2010 | Gallegos-Lopez et al. ........................... | 318/400.02 |
| 2010/0259207 | A1 * | 10/2010 | Kitanaka ................... | 318/400.17 |
| 2011/0050141 | A1 * | 3/2011 | Yeh et al. ....................... | 318/434 |
| 2011/0241578 | A1 * | 10/2011 | Kim et al. ............... | 318/400.02 |
| 2012/0217915 | A1 * | 8/2012 | Wu et al. ................... | 318/400.07 |
| 2012/0217921 | A1 * | 8/2012 | Wu et al. ........................ | 318/490 |
| 2012/0217923 | A1 * | 8/2012 | Wu et al. ........................ | 318/610 |
| 2013/0093371 | A1 * | 4/2013 | Akasako ................. | 318/400.02 |

* cited by examiner

*Primary Examiner* — Paul Ip
(74) *Attorney, Agent, or Firm* — Ingrassia Fisher & Lorenz, P.C.

(57) ABSTRACT

Methods and apparatus are provided for rotor and stator temperature compensation for field weakening current. The method comprises generating a phase voltage feed back signal $V_{ph}$ based in part on pre-defined optimal current commands ($I_D^*$ and $I_Q^*$) received by the IPM, generating a phase voltage command ($V_{phcmd}$) based in part on a temperature of a magnetic rotor and stator of the IPM, and generating a phase voltage error ($V_{error}$) by subtracting the phase voltage feed back signal ($V_{ph}$) from the phase voltage command ($V_{phcmd}$). The method further comprises generating a d-axis command current correction value ($\Delta I_d$) and a q-axis command current correction value ($\Delta I_q$) from the phase voltage error ($V_{error}$); and adjusting the pre-defined optimal current commands ($I_D^*$ and $I_Q^*$) by the d-axis and the q-axis command current correction values ($\Delta I_d$ and $\Delta I_q$).

19 Claims, 7 Drawing Sheets

TEMPERATURE COMPENSATION FOR IMPROVED FIELD WEAKENING ACCURACY

TECHNICAL FIELD

The present invention generally relates to electric motors, and more particularly relates to temperature compensation of field weakening current for integrated permanent magnet electric motors.

BACKGROUND OF THE INVENTION

An electric machine converts electrical power into mechanical force and motion. Electric machines are found in numerous applications including household appliances such as fans, refrigerators, and washing machines. Electric drives are also increasingly used in electric and hybrid-electric vehicles.

A rotary electric machine generally has an internal rotating magnet, called the rotor, which revolves inside a stationary stator. The interaction between the rotor electromagnetic field with the field created by the stator winding creates the machine torque. The rotor may be a permanent magnet or it may be an electromagnet. However, if the rotor has permanent magnets embedded therein (i.e., the permanent magnets are not in the rotor surface), the electric machine may be referred to as an interior permanent magnet (IPM) machine.

The part of the machine across which the input voltage is supplied is called the "armature". Depending upon the design of the machine, either the rotor or the stator can serve as the armature. In an IPM machine, the armature is the stator, and is a set of winding coils powered by input voltage to drive the electric machine.

The reverse task of converting mechanical energy into electrical energy is accomplished by a generator or dynamo. An electrical machine as discussed above may also function as a generator since the components are the same. When the machine/generator is driven by mechanical torque, electricity is output. Traction machines used on hybrid and electric vehicles or locomotives often perform both tasks.

Typically as an electric machine accelerates, the armature (and hence field) current reduces in order to maintain voltage of the stator within limits. The reduction in field current which reduces magnetic flux inside the machine is also called flux or field weakening current. Field weakening current control techniques can be used to increase performance in the torque-speed characteristic of the machine. To retain control of stator current, the machine field may be reduced by a field weakening current control loop. The field or flux weakening in an IPM machine can be accomplished by adjusting the stator excitation, for example. Stator excitation in an IPM machine may be controlled by voltage pulse width modulation (PWM) of a voltage source inverter.

Flux weakening techniques have been used in the past where IPM flux is purposely weakened to reduce the problems associated with high flux, such as over voltage due to high Back-Electro Motive Force (Back-EMF). For example, during a constant torque region of operation of an electric machine, closed loop current regulator control has been used to control the applied PWM voltage excitation so that the instantaneous phase currents follow their commanded values. However, saturation of the current regulators may occur at higher speeds when the machine terminal voltage approaches the maximum voltage of the PWM inverter. Beyond this point, the flux should be weakened to maintain proper current regulation up to the maximum available machine speed. Reducing the magnetic flux inside the machine provides improved power characteristics of the IPM machine at high speeds.

In many applications, the correct current inputs to efficiently weaken the flux are preprogrammed into the flux control circuits of an IPM system. The pre-programming is stored in a data structure such as a data table. Unfortunately time varying rotor temperature changes cause deviation in the flux produced by the preprogrammed flux weakening currents, thus rendering the pre-programmed flux weakening currents to be sub-optimal for the actual flux being produced.

Accordingly, it is desirable to compensate for time varying temperature effects on rotor flux. In addition it is desirable to adjusting stator current in real time for rotor temperature changes. Furthermore, other desirable features and characteristics will become apparent from the subsequent detailed description and the appended claims, taken in conjunction with the accompanying drawings and the foregoing technical field and background.

SUMMARY OF THE INVENTION

A method is provided for controlling field-weakening accuracy in an integrated permanent magnet (IPM) electric motor. The method comprises generating a phase voltage feed back signal $\Psi_{phCmd}$ based in part on pre-defined optimal current commands ($I_d^{}$ and $I_q^{}$) received by the IPM and rotor temperature of IPM machine, generating a phase voltage command $V_{phCmd}$ based in part on rotor speed, current magnitude, stator resistance, and stator a temperature. A phase voltage error $V_{error}$ is obtained by subtracting phase voltage feedback $V_{ph}$ from phase voltage command $V_{phCmd}$. The method further comprises generating a d-axis command current correction value $\Delta I_d$ and a q-axis command current correction value $\Delta I_q$ from the phase voltage error $V_{error}$; and adjusting the pre-defined optimal current commands ($I_D^*$ and $I_Q^*$) by the d-axis and the q-axis command current correction values ($\Delta I_d$ and $\Delta I_q$).

A control loop is provided for field weakening in an electric machine comprising a permanent magnetic rotor. The control loop comprises a first current regulator configured to convert an adjusted current command for the d-axis ($I_d^{**}$) to a synchronous command voltages ($V_d^*$), a second current regulator configured to convert an adjusted current command for the q-axis ($I_q^{**}$) to a synchronous command voltages ($V_q^*$), and an arithmetic unit configured to generated a phase voltage ($V_{ph}$) from the synchronous command voltages ($V_d^*$ and $V_q^*$). The control loop receives input from a flux linkage correction module, the flux linkage correction module. The flux linkage correction module is configured to receive a rotor temperature ($T_R$) and a rotor speed and is configured to produce a phase voltage command ($V_{phcmd}$). The control loop also includes a feed back path configured to subtract the phase voltage ($V_{ph}$) from the phase voltage command ($V_{phcmd}$) and configured to generate both of a d-axis command current correction value $\Delta I_d$ and a q-axis command current correction value $\Delta I_q$ based on the summation as inputs to the first current regulator and the second current regulator.

A control loop is provided for field weakening in an electric machine comprising a permanent magnetic rotor. The control loop comprises a first current regulator configured to convert an adjusted current command for the d-axis ($I_d^{**}$) to a synchronous command voltages ($V_d^*$), a second current regulator configured to convert an adjusted current command for the q-axis ($I_q^{**}$) to a synchronous command voltages ($V_q^*$), and an arithmetic unit configured to generated a phase voltage ($V_{ph}$) from the synchronous command voltages ($V_d^*$ and $V_q^*$). The control loop receives input from a flux linkage correction module, the flux linkage correction module configured to receive a rotor temperature, stator temperature, adjusted d-axis current command, adjusted q-axis current command a rotor speed and a phase current ($I_{ph}$) and configured to produce a phase voltage command ($V_{phCmd}$). The control loop further comprises a feed back path configured to subtract the phase voltage ($V_{ph}$) from the phase voltage command ($V_{phcmd}$) and configured to generate both of a d-axis command current correction value $\Delta I_d$ and a q-axis command current correction value $\Delta I_q$ based on the summation as inputs to the first current regulator and the second current regulator.

DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the invention may be described herein in terms of functional and/or logical block components and various processing steps. It should be appreciated that such block components may be realized by any number of hardware, software, and/or firmware components configured to perform the specified functions. For example, an embodiment of the invention may employ various integrated circuit components, e.g., memory elements, controlled switches, digital signal processing elements, logic elements, look-up tables, or the like, which may carry out a variety of functions under the control of one or more microprocessors or other control devices. In addition, those skilled in the art will appreciate that embodiments of the present invention may be practiced in conjunction with any number of vehicle applications and that the system described herein is merely one example embodiment of the invention.

For the sake of brevity, conventional techniques and components related to vehicle electrical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the invention.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described below in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the schematics depict example arrangements of elements, additional intervening elements, devices, features, modules or components may be present in an embodiment of the invention (assuming that the functionality of the system is not adversely affected).

Embodiments of the invention are described herein in the context of one practical non-limiting application, namely, a control system for an integrated permanent magnet (IPM) machine. In this context, the example technique is applicable to operation of a system suitable for an electric vehicle or a hybrid electric vehicle. Embodiments of the invention, however, are not limited to such vehicle applications, and the techniques described herein may also be utilized in other electric powered control applications.

Figure 1:
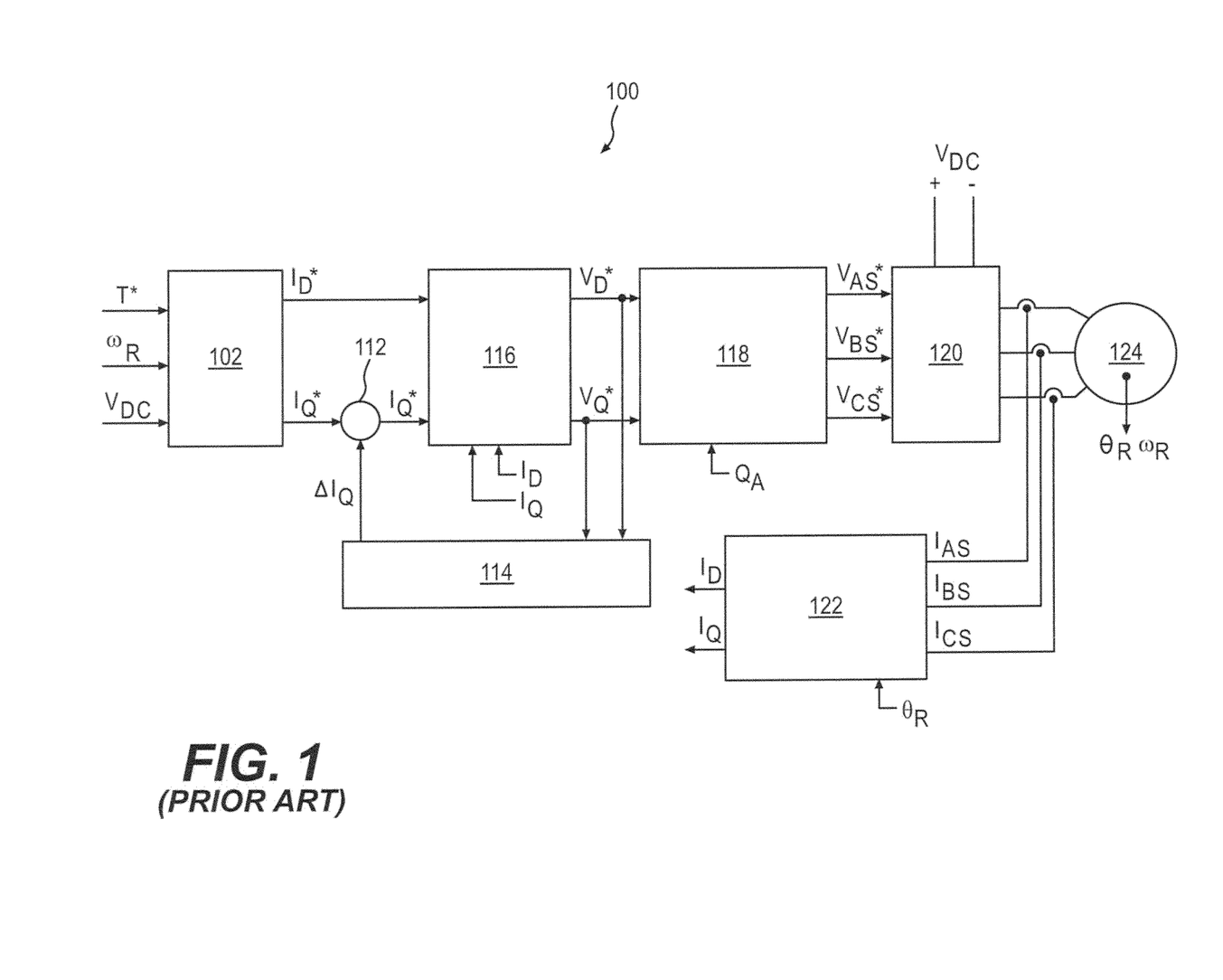
FIG. 1 is a functional block diagram that includes an existing control system for a vector controlled IPM Machine.

FIG. 1 is a functional block diagram that depicts an existing control system 100 for a vector controlled IPM machine suitable for use with a hybrid vehicle. Such systems are well known and, therefore, the operation of control system 100 will not be described in detail here. In summary, control system 100 adjusts the q-axis component of the stator current command $I_Q^*$ (q-axis current command) of the IPM machine using a flux weakening control loop. Control system 100 includes: a current command 3-D table lookup module 102, a synchronous current regulator module with dynamic over modulation 116, a DC to AC transformation module 118, a PWM inverter 120, an AC to DC transformation module 122, an IPM machine 124, and a field weakening module 114. Control system 100 operates as described below.

Based on a torque command T*, the rotor rotational speed $\omega_R$, and a DC-link voltage $V_{DC}$, pre-defined optimal current commands ($I_D^*$ and $I_Q^*$) are generated using the current command 3-D table look-up module 102. The inputs to the table look-up module 102 are provided by a voltage sensor from the $V_{DC}$ input to the inverter 120, and a position sensor (not shown in FIG. 1) from the IPM machine 124. The q-axis current command $I_Q^*$ is adjusted to obtain an adjusted current command ($I_Q^{**}$) as explained below.

The $I_D$ and $I_Q$ stationary currents (d-axis and q-axis components of the stator current) from the IPM machine 124 are fed to the synchronous current regulator module with dynamic over modulation 116, which generates synchronous voltage commands ($V_D^*$ and $V_Q^*$). The command voltages $V_D^*$ and $V_Q^*$ are vector rotated using the rotor angular position $\theta_R$, which is provided by IPM machine 124. The outputs of the current regulator with dynamic over modulation 116 (namely, $V_D^*$ and $V_Q^*$) are fed to the DC to AC transformation module 118 to generate stationary frame voltage commands ($V_{AS}^*$, $V_{BS}^*$ and $V_{CS}^*$) based on $V_D^*$ and $V_Q^*$.

The $V_{AS}^*$, $V_{BS}^*$ and $V_{CS}^*$ stationary frame voltage commands are fed to the inverter 120 to generate $I_{AS}$, $I_{BS}$ and $I_{CS}$, which are the respective stationary frame currents. The inverter 120 may be, for example, a PWM inverter which applies alternating three phase voltage to the stator winding of the IPM machine 124. The IPM machine 124 then operates at the rotational speed $\omega_R$ based on the stationary frame currents $I_{AS}$, $I_{BS}$ and $I_{CS}$.

The AC to DC transformation module 122 generates $I_D$ and $I_Q$ (the d-axis and q-axis components of the stator feedback current) based on $I_{AS}$, $I_{BS}$, $I_{CS}$, and $\theta_R$. Additional details of the control system 100 can be found in United States Patent Application Number 2005/0212471, the content of which is hereby incorporated by reference in its entirety.

The back electromotive force ("Back-EMF") is proportional to the rotational speed $\omega_R$. Moreover, the Back-EMF of the IPM increases as the rotational speed $\omega_R$ of the IPM is increased. Above a certain rotational speed, the voltage of the IPM machine may become higher than the voltage of a bus (not shown), resulting in reversal of current flow (regenerating instead of motoring). To control the $I_D$ and $I_Q$ components of the stator current, the machine flux is reduced by a field weakening control loop. The field weakening module 114 generates a command current adjusting value $\Delta I_Q$ ($\Delta I_Q$ is the adjusting q-axis current value), which decreases the flux in the machine but also decreases the torque), based on $V_D^*$ and $V_Q^*$ to adjust the current command $I_Q^*$. For example, $\Delta I_Q$ is then added to $I_Q^*$ by an adder 112 to generate the adjusted current command $I_Q^{**}$.

Adjusting $I_D^*$ and $I_Q^*$ in this manner results in a decrease in the torque, as will be explained in the context of FIG. 2. The aforementioned reduction in torque reduces the maximum torque available from the IPM machine, and it may reduce the machine efficiency. Additional details of the field weakening module 114 can be found in U.S. patent application Ser. No. 11/552,580, filed Oct. 25, 2006, which is hereby incorporated by reference in its entirety.

Figure 2:
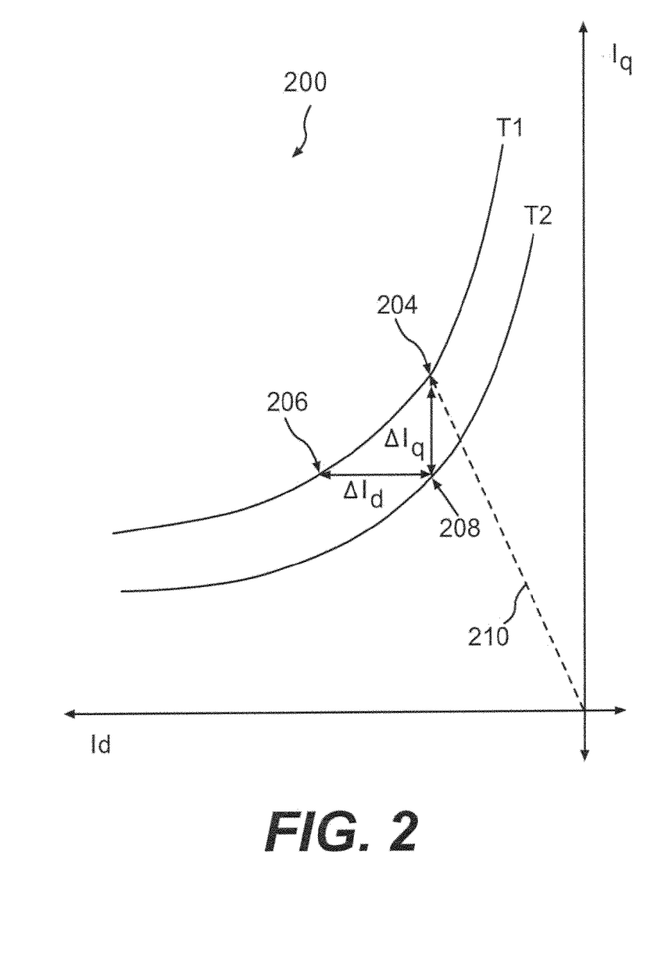
FIG. 2 illustrates current regulation performance for an IPM machine with and without torque linearity control.

FIG. 2 illustrates current regulation performance with and without torque linearity control. The field weakening control loop module 114 (FIG. 1) keeps the current regulator stable at the available voltage by adjusting the $I_q^*$ current by an amount $\Delta I_q$ as explained above. Delta $I_q$ however, moves the current vector 210 from point 204 on the T1 constant torque curve to point 208 on the T2 constant torque curve, thereby decreasing the torque in direct proportion to the flux. It is desirable to keep the current vector on the T1 constant torque curve in the field weakening region of the IPM machine. To this end, the control loop of a torque linearity module (not shown) generates $\Delta I_d$, which moves the current vector 210 from point 208 on the T2 constant torque curve to point 206 on the T1 constant torque curve, thereby keeping the torque constant and maintaining torque linearity in a field weakening region of the IPM machine.

The techniques described herein adjust both $I_d$ and $I_q$ components of the stator current to account for adverse time varying rotor temperature ($T_R$) changes that affect flux in the field weakening region to maintain torque performance.

Figure 3:
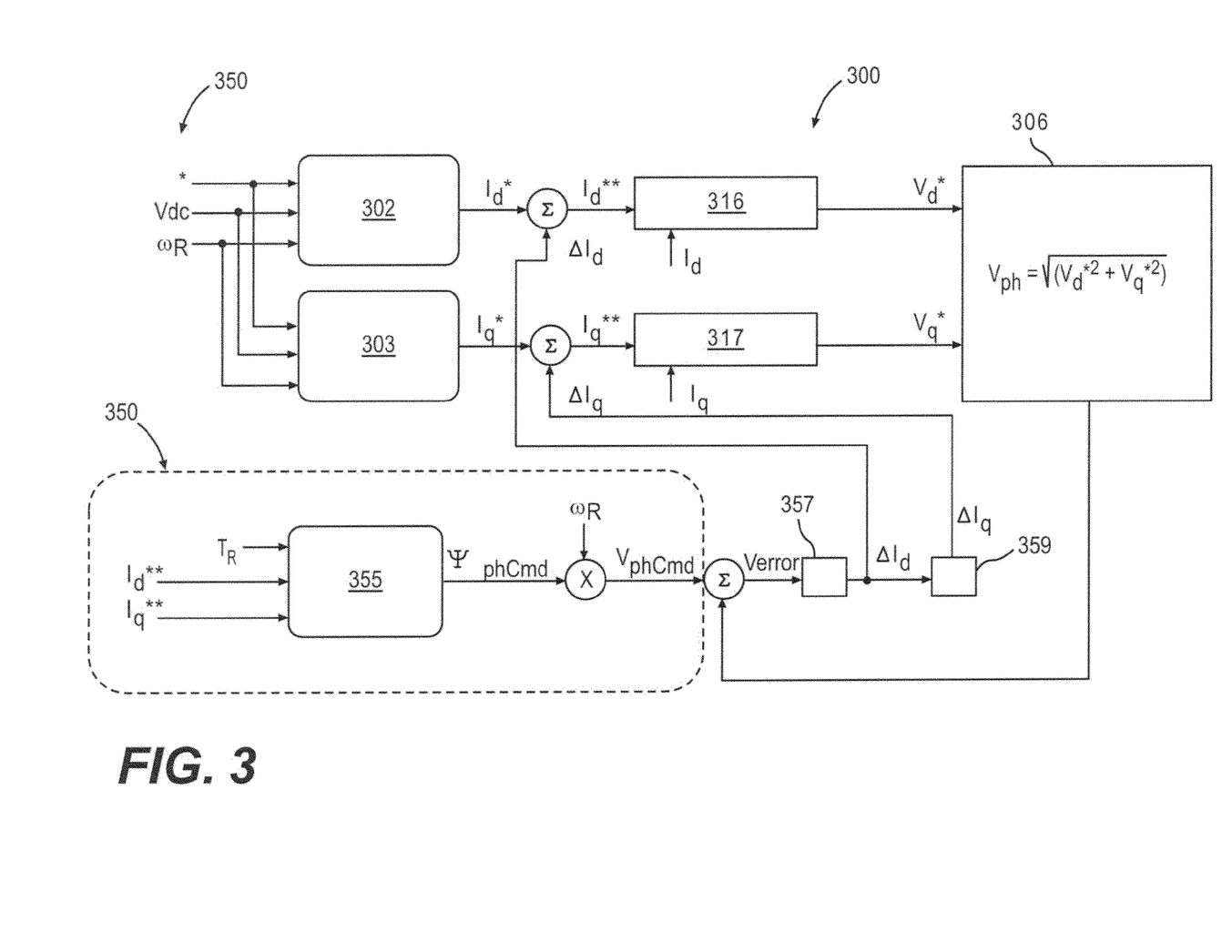
FIG. 3 is a functional block diagram of a control loop for field weakening in an electric machine comprising a permanent magnetic rotor according to embodiments.

FIG. 3 a functional block diagram of a control loop for field weakening in an electric machine comprising a permanent magnet rotor according to an embodiment. As an input, the motor torque command T*, the DC-link voltage $V_{DC}$, and rotor speed $\omega_R$ are received by control system 300. The torque command T*, the DC-link voltage $V_{dc}$, and rotor speed $\omega_R$ are inputs to the $I_d$ look up table 302 and the $I_q$ look up table 303, which produce a pre-defined optimal d-axis current command $I_d$* and a pre-defined optimal q-axis current command $I_q$*. The pre-defined d-axis current command $I_d$* and the pre-defined q-axis current command $I_q$* are added to the command current correction values $\Delta I_d$ and $\Delta I_q$ to obtain d-axis adjusted current command ($I_d$), and q-axis adjusted current command ($I_q$) as inputs to the current regulators 316 and 317. The current regulators 316 and 317 generate synchronous command voltages $V_d$* and $V_q$* from which a phase voltage $V_{ph}$ is calculated by arithmetic module 306 as the square root of the sum of the squares of the synchronous command voltages. The phase voltage $V_{ph}$ is an input component of command current correction values $\Delta I_d$ and $\Delta I_q$ along with the output of the flux linkage correction module 350.

The flux linkage correction module 350 may be embodied as hardware software, firmware or a combination thereof and may be controlled or executed by a processor or a combination of multiple processors. The flux linkage correction module 350 receives the current Rotor Temperature ($T_R$) and adjusted current commands $I_d$ and Iq as inputs to the flux linkage look up table 355. The flux linkage look up table 355 contains pre-determined rotor flux data as a function of Rotor Temperature ($T_R$) (See, FIGS. 5-7). Thus, for a specific combination of $I_d$, Iq and Rotor Temperature, the flux linkage look up table 355 outputs a rotor flux command $\psi_{phCmd}$, which is subsequently multiplied by the rotor speed $\omega_R$ to produce a phase voltage command $V_{phCmd}$. The phase voltage $V_{ph}$ generated by the arithmetic module 306 is then subtracted from the phase voltage command ($V_{phCmd}$).

The phase voltage $V_{ph}$ is a feedback signal subtracted from the phase voltage command $V_{phCmd}$ to produce the voltage error $V_{error}$, which is processed by a proportional integrator (PI) regulator to produce the command current correction values $\Delta I_d$ and $\Delta I_q$, which are each summed with their respective pre-defined d-axis current command Id* and pre-defined q-axis current command Iq*, as discussed above.

The phase voltage error ($V_{error}=V_{phCmd}-V_{ph}$) is then processed by a proportional integrator controller 357 to generate the command current correction value $\Delta I_d$. Command current correction value $\Delta I_d$ is further processed by an amplifier 359 with a gain K to generate command current correction value $\Delta I_q$. In equivalent embodiments the amplifier K may be replaced with a function look up table as function of $I_d$ and Iq to produce command current correction value $\Delta I_q$ from command current correction value $\Delta I_d$.

Figure 4:
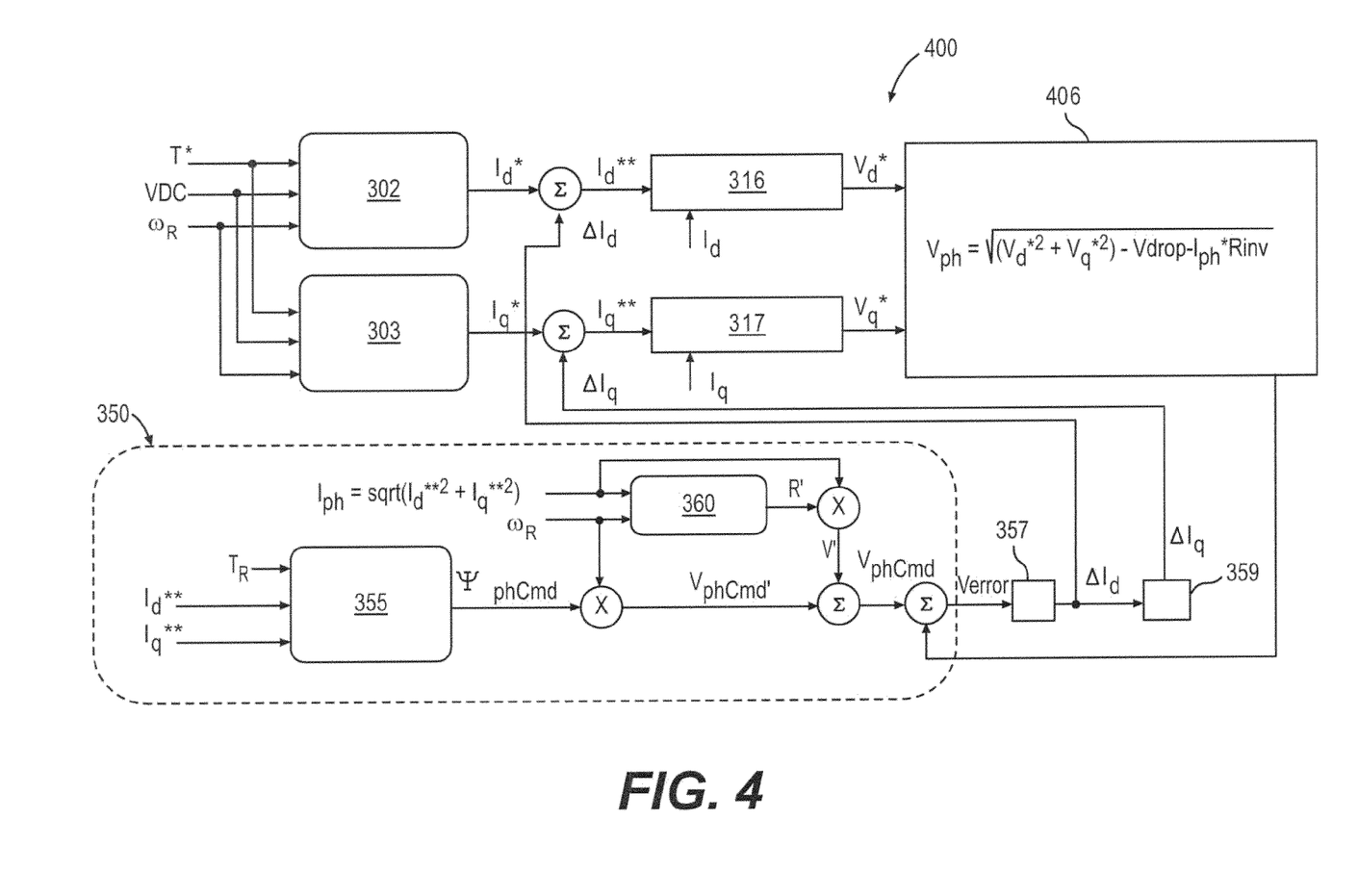
FIG. 4 is a functional block diagram of a control loop for field weakening in an electric machine comprising a permanent magnetic rotor according to other embodiments.

FIG. 4 is a functional block diagram of a control loop for field weakening in an electric machine comprising a permanent magnet rotor according to another embodiment. As inputs, the motor torque command T*, the DC-link voltage $V_{DC}$, and rotor speed $\omega_R$ are received by control system 400. The torque command T*, the DC-link voltage $V_{DC}$, and rotor speed $\omega_R$ are inputs to the $I_d$ look up table 302 and the $I_q$ look up table 303, respectively, which produces a pre-defined d-axis current command $I_d$* and a pre-defined q-axis current command $I_q$*. The pre-defined d-axis current command $I_d$* and a pre-defined q-axis current command $I_q$* are added to the command current correction values $\Delta I_d$ and $\Delta I_q$ to obtain d-axis adjusted current command ($I_D$), and q-axis adjusted current command ($I_Q$) as inputs to the current regulators 316 and 317. The current regulators 316 and 317 generate synchronous command voltages $V_d$* and $V_q$* from which a phase voltage $V_{ph}$ is calculated by arithmetic module 406 as the sum of the squares of the synchronous command voltages. The phase voltage $V_{ph}$ is a component of command current correction values $\Delta I_d$ and $\Delta I q$ along with the output of the flux linkage correction module 350.

The arithmetic module 406 also adjusts the phase voltage $V_{ph}$ for any fixed voltage drops across the inverter 120. Such fixed voltage drops may include voltage drops across any related terminal connections and/or power switches such as an insulated-gate bi-polar transistor (IGBT). The arithmetic module 406 also adjusts for phase current driven voltage drops $V_{ph}*R_{inv}$) across the inverter 120.

The flux linkage correction module 350 may be embodied as hardware software, firmware or a combination thereof and may be controlled or executed by a processor or a combination of multiple processors. The flux linkage correction module 350 receives as inputs the current Rotor Temperature ($T_R$) and adjusted current commands $I_d$ and Iq, which will be discussed further below. The Rotor Temperature, $I_d$ and $I_q$ are received as inputs to the flux linkage look up table 355, which contains pre-determined rotor flux data as a function of Rotor Temperature. The flux linkage look up table 355 outputs a rotor flux command $\psi_{phCmd}$, which is subsequently multiplied by the rotor speed $\omega_R$ to generate an intermediary phase voltage command ($V_{phCmd'}$).

In addition to being an input to produce the intermediary phase voltage command $V_{ph}$Cmd', rotor speed $\omega_R$ is also used as an input to a stator resistance look up table 360. This stator resistance adjustment compensates for changes in the stator resistance $R_s$ due to stator temperature changes, and for rotor speed $\omega_R$. Near room temperature, the electric resistance of a typical metal increases linearly with rising temperature. The amount of that change in resistance can be calculated using the temperature coefficient of resistivity of the conductor using the following formula:

$$R(T)=R_0[1+\alpha(T-T_0)]$$

where T is its temperature, $T_0$ is a reference temperature (usually room temperature), $R_0$ is the resistance at $T_0$, and $\alpha$ is the percentage change in resistivity per unit temperature. The constant $\alpha$ depends only on the conductor material being considered. The relationship stated is actually only an approximate one, the true physics being somewhat non-linear. Looking at it another way, $\alpha$ itself varies with temperature. For this reason it is common practice to specify the temperature that $\alpha$ was measured at with a suffix, such as $\alpha_{15}$ and the relationship only holds in a range of temperatures around the reference.

Continuing, $I_{ph}$ as the square root of the sum of the squared values of the adjusted current commands ($I_d$ and $I_q$) is also an input into the $R_s$ lookup table 360, which outputs an adjusted stator resistance (R'). A stator voltage adjustment (V') is then determined by multiplying the adjusted stator resistance (R') by the Phase current ($I_{ph}$). The stator resistive voltage (V') is then summed with the phase voltage command ($V_{ph}$Cmd') to produce the phase voltage command ($V_{phCmd}$). The phase voltage ($V_{ph}$) generated by the arithmetic module 406 is subtracted from the phase voltage command $V_{phCmd}$ to produce the phase voltage error ($V_{error}=V_{phCmd}-V_{ph}$).

The phase voltage error ($V_{error}=V_{phCmd}-V_{ph}$) is then processed by the PI controller 357 to generate command current correction value $\Delta I_d$. Command current correction value $\Delta I_d$ is further processed by an amplifier 359 with a gain K to generate a command current correction value $\Delta I_q$.

Figure 5A:
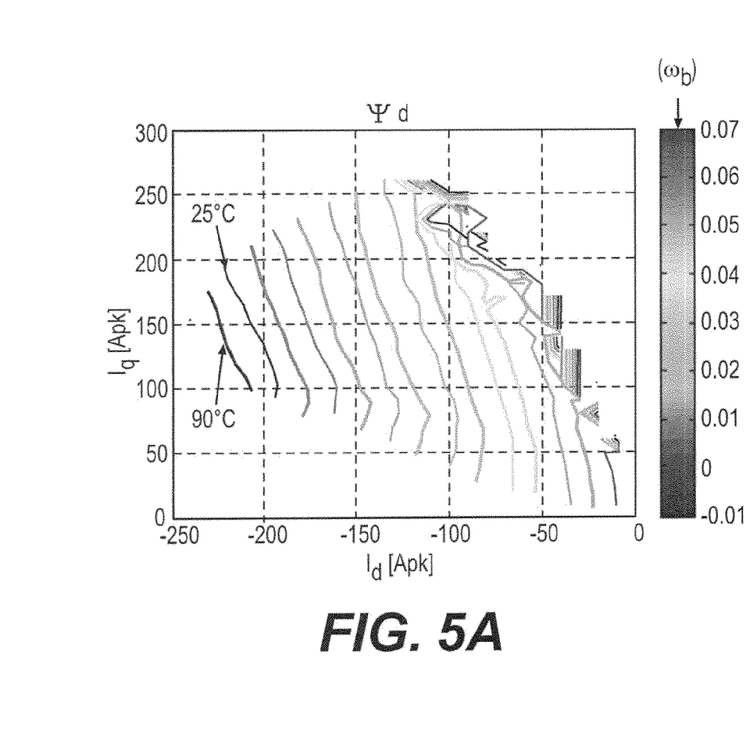
FIGS. 5A and 5B illustrate the relationship between the d-axis and q-axis components of the phase current of an IPM machine and d-axis flux and q-axis flux in view of rotor temperature.
Figure 5B:
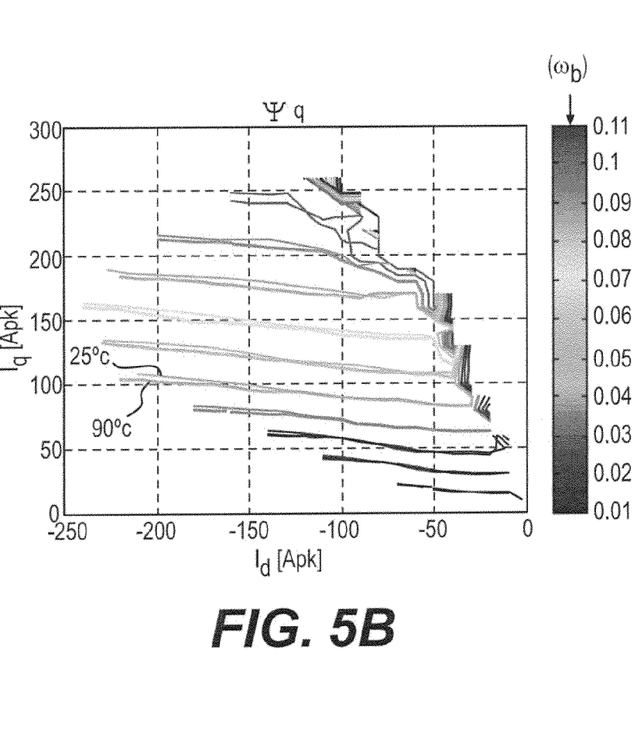

FIGS. 5A and 5B illustrate graphical representations presenting flux linkage data $\psi_d$ and $\psi_q$ at 25° C. and 90° C., respectively, as a function of the stationary currents $I_d$ and $I_q$.

Each colored curve represents different flux strength. FIGS. 5A and 5B demonstrate that larger values for the stationary currents $I_d$ and $I_q$ are required to obtain the same flux linkage when the rotor magnet(s) are warmer. As can be seen comparing FIGS. 5A and 5B, the flux linkage $\psi_d$ exhibits a significant change in magnitude as a function of temperature while the flux linkage $\psi_q$ exhibits a small change with temperature. The flux linkage is inversely proportional to temperature. In embodiments described herein, the flux linkage data presented in FIGS. 5A and 5B may be used as the data in the flux-linkage look up table 355 in the field weakening module 350 (FIG. 3) of the field weakening control loop 114 (FIG. 1).

Figure 6:
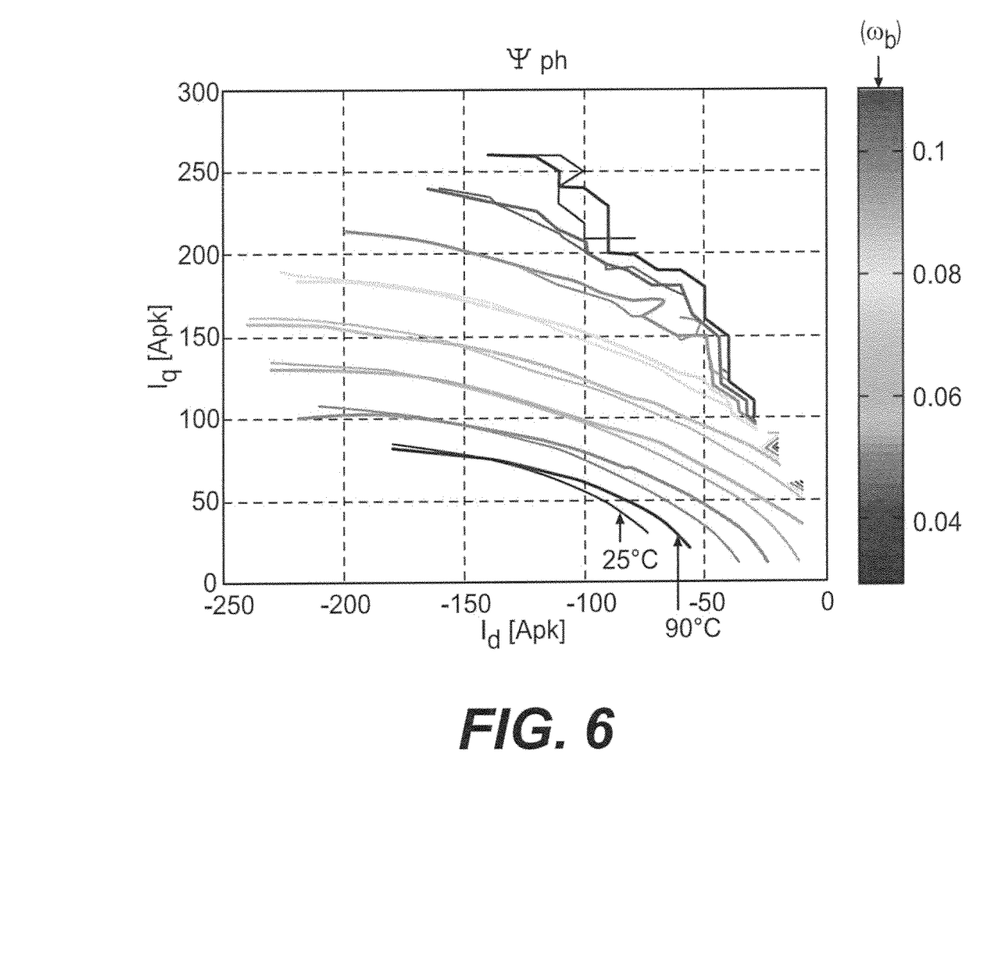
FIG. 6 illustrates the relationship between the d-axis and q-axis components of the phase current of an IPM machine and phase flux and rotor temperature.

FIG. 6 is graphical representation of the phase flux linkage $\psi_{ph}$, which is the flux linkage magnitude of the combined flux linkages $\psi_d$ and $\psi_q$ demonstrating the shift in $I_{ph}$ with changes in temperature.

Figure 7:
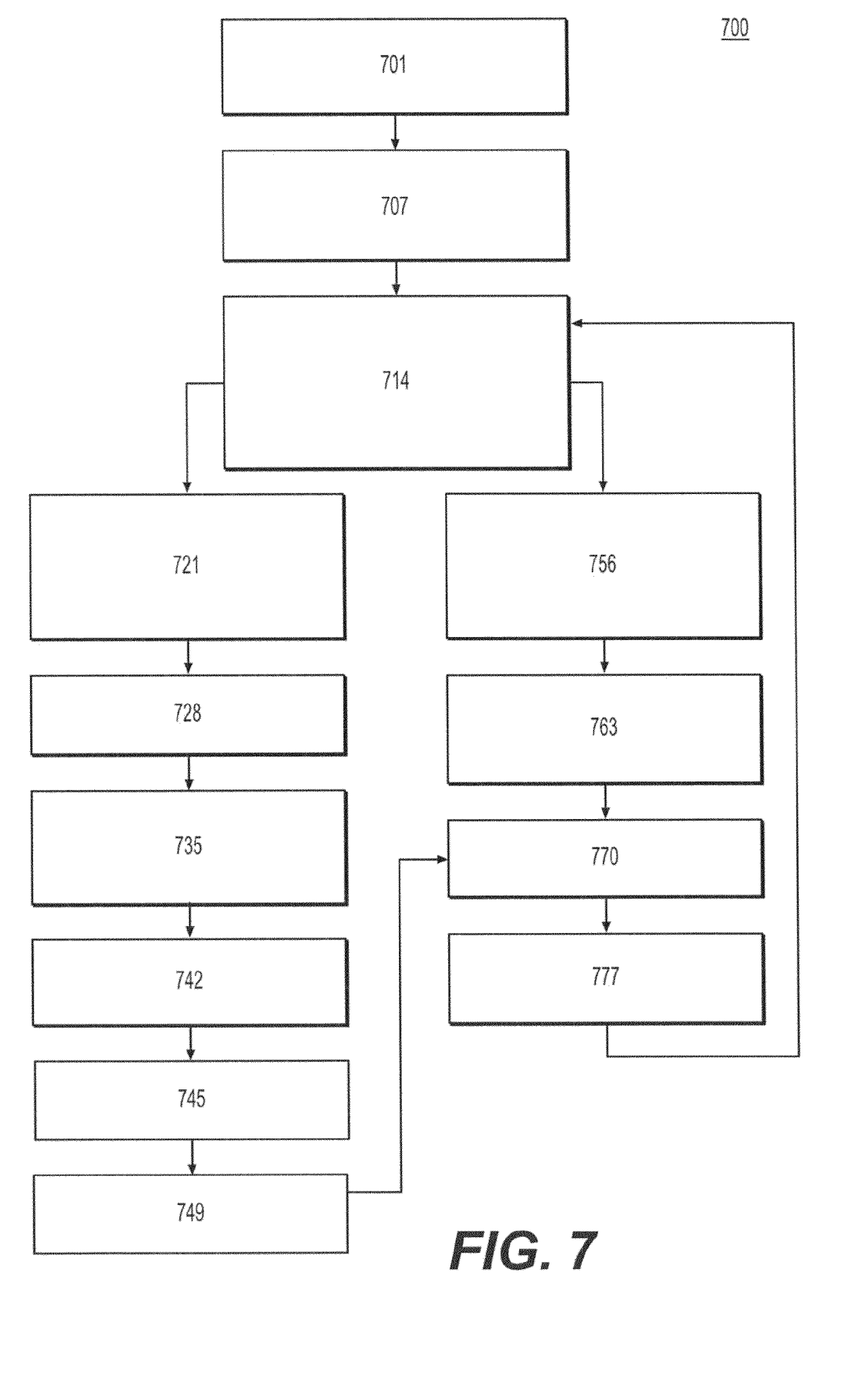
FIG. 7 is a flow chart of an exemplary method for controlling field-weakening accuracy in an integrated permanent magnet (IPM) electric motor.

FIG. 7 is a flow chart of an exemplary computer processor executed method 700 according to the embodiment of FIG. 4 disclosed herein for controlling field-weakening accuracy in an integrated permanent magnet (IPM) electric motor due to temperature changes. The exemplary embodiment of FIG. 4 is essentially identical to that of FIG. 3 with the addition of the stator resistance look up table 360. As such, only the method of FIG. 4 will be discussed herein below in the interest of brevity.

The method 700 begins at process 701 where a processor (not shown) receives as inputs a torque command (T*) from an operator or an autopilot, a rotor speed ($\omega_R$) and a DC-ling voltage ($V_{dc}$). At process 707, the processor looks up the q-axis ($I_q^*$) and the d-axis ($I_d^*$) components of a corresponding stator current command. The look up operation may utilize a look up table or any other suitable data storage structure.

At process 714, the q-axis ($I_q^*$) and the d-axis ($I_d^*$) components of a corresponding stator current command are adjusted by summing ($I_q^*$ and $I_d^*$) by their corresponding command current correction values ($\Delta I_q$ and $\Delta I_d$), respectively, to produce the adjusted current commands ($I_d^{}$ and $I_q^{}$). The determination of ($\Delta I_q$ and $\Delta I_d$) will be discussed in more detail below.

At process 756, the d-axis and q-axis components ($I_d$ and $I_q$) of the phase current ($I_{ph}$) are subtracted from the adjusted current commands ($I_d^{}$ and $I_q^{}$) to obtain current error in the d-axis and q-axis, which are processed by the PI controller 357 to generate synchronous command voltages ($V_d^*$ and $V_q^*$), respectively using a pair of current regulators 316 and 317 (FIG. 4). Those of ordinary skill in the art will appreciate that the specific device converting the adjusted current commands to the synchronous command voltages does not necessarily have to be a current regulator. Other suitable devices, software, firmware or combination thereof may suffice as well. For example a function may suffice.

At process 763, an adjusted phase voltage ($V_{ph}$) is calculated by taking the square root of the sum of the squares of the synchronous command voltages ($V_d^*$ and $V_q^*$) and is further adjusted for the fixed voltage drop across the inverter 120 (See, FIG. 1) and the voltage drop across the inverter due to the equivalent resistance of the inverter.

Simultaneously with processes 756 and 763, at process 745 a processor (not shown) receives the IPM Rotor Temperature ($T_R$) and the adjusted current commands $I_d^{}$ and $I_q^{}$ as inputs. The processor then looks up a corresponding phase flux command ($\psi_{phCmd}$). The look up operation for the phase flux command ($\psi_{phCmd}$) may utilize a look up table or any other suitable data storage structure. The phase flux command ($\psi_{phCmd}$) may then be used to determine an intermediary phase voltage command ($V_{phCmd'}$) by multiplying by the rotor speed ($\omega_R$). In the alternate embodiment of FIG. 3, the $\psi_{phCmd}$ may then be used to determine the phase voltage command ($V_{phCmd}$) directly.

At process 735, a processor (not shown) receives a phase current ($I_{ph}$), which may be calculated as the square root of the sum of the squares of the adjusted current commands ($I_d^{}$ and $I_q^{}$), a stator temperature and the rotor speed ($\omega_R$) as input values for the stator resistance look up table $R_s$. A resistance adjustment value R' is output from the stator resistance look up table and is used to determine a stator voltage adjustment (V') by multiplying the phase current by the resistance value (R') at process 742.

At process 749, the phase voltage command (VphCmd) is calculated by summing the stator voltage adjustment (V') with the voltage adjustment command ($V_{ph}'$). At process 770, the phase voltage error ($V_{error}$) is determined by subtracting the phase voltage ($V_{ph}$) determined at process 763 from the phase voltage command ($V_{phCmd}$).

At process 777, the phase voltage error ($V_{error}$) is converted to the command current correction values $\Delta I_q$ and $\Delta I_d$ using a proportional-integral controller 357 and an amplifier 359 (FIG. 4). The command current correction values $\Delta I_q$ and $\Delta I_d$ are then used to adjust the q-axis ($I_q^*$) and the d-axis ($I_d^*$) components of the stator current command as discussed above in regard to process 714.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling field-weakening accuracy in an integrated permanent magnet (IPM) electric motor, comprising:
    generating a phase voltage feed back signal $V_{ph}$, based in part on pre-defined optimal current commands ($I_d^*$ and Iq*) received by the IPM;
    generating a phase voltage command $V_{phcmd}$ based in part on a temperature ($T_R$) of a magnetic rotor of the IPM;
    generating a phase voltage error $V_{error}$ by subtracting the phase voltage feed back signal $V_{ph}$ from the phase voltage command $V_{phcmd}$;
    generating a d-axis command current correction values $\Delta I_d$ and a q-axis command current correction value $\Delta I_q$ from the phase voltage error $V_{error}$; and
    adjusting the pre-defined optimal current commands (Id* and Iq*) by the d-axis and the q-axis command current correction values ($\Delta I_d$ and $\Delta I_q$).

2. The method of claim 1 wherein the phase voltage command $V_{phcmd'}$ is a product of a speed of the magnetic rotor of the IPM and a rotor flux command $\psi_{phCmd}$.

3. The method of claim 2 wherein the rotor flux command ($\psi_{phCmd}$) is generated from a data structure containing temperature based flux-linkage data that is accessed by a temperature of the magnetic rotor of the IPM, a d-axis adjusted current command ($I_d^{}$), and a q-axis adjusted current command ($I_q^{}$).

4. A field weakening control loop for an electric machine including a permanent magnetic rotor, comprising:

a first current regulator configured to convert a d-axis adjusted current command ($I_d^{**}$) and a d-axis current feedback ($I_d$) to a synchronous voltage command ($V_d^*$);

a second current regulator configured to convert an q-axis adjusted current command ($I_q^{**}$) a q-axis current feedback ($I_q$) to a synchronous voltage command ($V_q^*$);

an arithmetic unit configured to generated a phase voltage ($V_{ph}$) from the synchronous voltage commands ($V_d^*$ and $V_q^*$);

flux linkage correction module, the flux linkage correction module configured to receive a rotor temperature ($T_R$) and a rotor speed ($\omega_R$) and configured to produce a phase voltage command ($V_{phcmd}$); and a feed back path configured to subtract the phase voltage ($V_{ph}$) from the phase voltage command ($V_{phcmd}$) and configured to generate both of a d-axis command current correction value $\Delta I_d$ and a q-axis command current correction value $\Delta I_q$ based on the subtraction as inputs to the first current regulator and the second current regulator.

5. The field weakening control loop of claim 4, wherein the flux linkage correction module comprises a memory device containing flux linkage data stored therein, wherein the flux linkage data relates a synchronous d-axis current ($I_d$) to a corresponding q-axis current ($I_q$) at a specific magnetic rotor temperature.

6. The field weakening control loop of claim 5, wherein the flux linkage data is stored in a look up table that uses a temperature ($T_R$) of the permanent magnetic rotor, the d-axis adjusted current command ($I_d^{}$) and the q-axis adjusted current command ($I_q^{}$) for input values and produces a rotor flux command ($\psi_{phCmd}$).

7. The field weakening control loop of claim 6, wherein the rotor flux command ($\psi_{phCmd}$) is multiplied by the rotor speed to generate phase voltage command ($V_{phCmd}$).

8. The field weakening control loop of claim 7, further comprising a proportional integrator configured to convert a difference between the phase voltage command ($V_{phCmd}$) and the phase voltage ($V_{ph}$) into the d-axis command current correction value ($\Delta I_d$).

9. The field weakening control loop of claim 7, further comprising an amplifier configured to convert the d-axis command current correction value ($\Delta I_d$) into the d-axis command current correction value.

10. A field weakening control loop for an electric machine with a permanent magnetic rotor and an inverter, comprising:

a first current regulator configured to convert a d-axis adjusted current command ($I_d^{**}$) and a d-axis current feedback ($I_d$) to a synchronous command voltages ($V_d^*$);

a second current regulator configured to convert a q-axis adjusted current command ($I_q^{**}$) and a q-axis current feedback ($I_q$) to a synchronous command voltages ($V_q^*$);

an arithmetic unit configured to generated a phase voltage ($V_{ph}$) from the synchronous command voltages ($V_d^*$ and $V_q^*$) adjusted for a voltage drop ($V_{drop}$) and a resistance loss ($R_{inv}$) across the inverter;

flux linkage correction module, the flux linkage correction module configured to receive a rotor temperature ($T_R$), a rotor speed ($\omega_R$) and a phase current ($I_{ph}$) and configured to produce a phase voltage command ($V_{phCmd}$); and a feed back path configured to subtract the phase voltage ($V_{ph}$) from the phase voltage command ($V_{phcmd}$) and configured to generate both of a d-axis command current correction value ($\Delta I_d$) and a q-axis command current correction value ($\Delta I_q$) based on the subtraction as inputs to the first current regulator and the second current regulator.

11. The field weakening control loop of claim 10, wherein the flux linkage correction module comprises a memory device containing flux linkage data stored therein, wherein the flux linkage data relates a stationary d-axis current ($I_d$) to a corresponding q-axis current ($I_q$) at a specific magnetic rotor temperature.

12. The field weakening control loop of claim 11, wherein the flux linkage data is stored in a look up table that uses a temperature of the permanent magnetic rotor, the d-axis adjusted current command ($I_d^{}$) and the q-axis adjusted current command ($I_q^{}$) for input values and produces a rotor flux command ($\psi_{phCmd}$).

13. The field weakening control loop of claim 12 wherein the rotor flux command ($\psi_{phCmd}$) is multiplied by the rotor speed to generate an adjusted phase voltage ($V_{ph}^*$).

14. The field weakening control loop of claim 13, further comprising a stator resistance look up table.

15. The field weakening control loop of claim 14, wherein the stator resistance look up table receives the phase current ($I_{ph}$), the rotor speed and a temperature of a stator as input values and produces a resistance adjustment value (R').

16. The field weakening control loop of claim 15, wherein the phase current ($I_{ph}$) is multiplied by the resistance adjustment value (R') to generate a voltage adjustment (V').

17. The field weakening control loop of claim 16 wherein the voltage adjustment (V') is added to the adjusted phase voltage ($V_{ph}^*$) to produce the phase voltage command ($V_{phCmd}$).

18. The field weakening control loop of claim 17, further comprising a proportional integrator configured to convert a difference between the phase voltage command ($V_{phCmd}$) and the phase voltage ($V_{ph}$) into the d-axis command current correction value ($\Delta I_d$).

19. The field weakening control loop of claim 18, further comprising an amplifier configured to convert the d-axis command current correction value ($\Delta I_d$) into the d-axis command current correction value.

* * * * *